United States Patent
Yun

(10) Patent No.: US 7,248,314 B2
(45) Date of Patent: Jul. 24, 2007

(54) LIQUID CRYSTAL DISPLAY WITH THE RED, GREEN, BLUE, AND YELLOW SUB-PIXELS SURROUNDING THE WHITE SUB-PIXEL

(75) Inventor: Jae-Kyeong Yun, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 476 days.

(21) Appl. No.: 11/012,117

(22) Filed: Dec. 16, 2004

(65) Prior Publication Data

US 2005/0140907 A1 Jun. 30, 2005

(30) Foreign Application Priority Data

Dec. 29, 2003 (KR) .................... 10-2003-0098643

(51) Int. Cl.
*G02F 1/1335* (2006.01)
(52) U.S. Cl. ................. 349/108; 349/106; 349/109
(58) Field of Classification Search ............. 349/106
See application file for complete search history.

(56) References Cited

U.S. PATENT DOCUMENTS 6,714,206 B1 * 3/2004 Martin et al. ............. 345/589

2002/0015110 A1 * 2/2002 Brown Elliott ............. 348/589
2004/0051724 A1 * 3/2004 Elliott et al. ............... 345/694

* cited by examiner

*Primary Examiner*—Andrew Schechter
*Assistant Examiner*—Lucy Chien
(74) *Attorney, Agent, or Firm*—McKenna Long & Aldridge LLP

(57) ABSTRACT

A LCD device includes a first substrate including a plurality of pixels each having a white (W) sub-pixel and red (R), green (G), blue (B) and yellow (Y) sub-pixels surrounding the W sub-pixel; thin film transistors each connected to gate and data lines over the first substrate; first to fourth pixel electrodes connected to each of the thin film transistors and disposed to correspond to one of the R, G, B and Y sub-pixels; a color filter layer including red (R), green (G), blue (B) and yellow (Y) color filters on a second substrate, each of the R, G, B and Y color filters corresponding to one of the R, G, B and Y sub-pixels; a common electrode on the color filter layer; and a liquid crystal layer interposed between the color filter layer and the first to fourth pixel electrodes.

24 Claims, 21 Drawing Sheets

LIQUID CRYSTAL DISPLAY WITH THE RED, GREEN, BLUE, AND YELLOW SUB-PIXELS SURROUNDING THE WHITE SUB-PIXEL

This application claims the benefit of Korean Patent Application No. P2003-0098643 filed on Dec. 29, 2003, which is hereby incorporated by reference for all purposes as if fully set forth herein.

BACKGROUND OF THE INVENTION

1. Field of the Invention

The present invention relates to a liquid crystal display (LCD) device, and more particularly, to a LCD device having a dynamic aperture ratio control system for controlling aperture ratio and brightness.

2. Discussion of the Related Art

A cathode ray tube (CRT) has been mainly used as displays for televisions and desktop computer monitors, but the CRT has disadvantages of heavy weight, large dimension and high power consumption. Therefore, flat panel display (FPD) devices have been demanded to substitute the CRT. For example, liquid crystal display (LCD) devices and electroluminescent display (ELD) devices have been researched and developed. Particularly, the LCD devices make use of optical anisotropy and polarization properties of liquid crystal molecules that are interposed between array substrate and color filter substrate FIG. 1 is an expanded perspective view of a liquid crystal display device according to the related art. The LCD device includes an upper substrate 5 that is commonly referred to as a color filter substrate, a lower substrate 22 that is commonly referred to as an array substrate, and a liquid crystal material layer 14 that is interposed between the upper and lower substrates 5 and 22, respectively. A color filter layer 7 is formed in the shape of a matrix on the upper substrate 5, and a black matrix 6 is also formed on the upper substrate 5. The color filter layer 7 includes a plurality of red (R), green (G) and blue color filters 7a, 7b and 7c, which are surrounded by the black matrix 6. Additionally, a common electrode 18 is formed on the cover of the color filter layer 7 and the black matrix 6.

A plurality of thin film transistors T are formed on the lower substrate 22 in the shape of a matrix corresponding to the color filters 7a, 7b and 7c. A plurality of crossing gate lines 13 and data lines 15 are perpendicularly positioned such that each thin film transistor (TFT) T is located adjacent to each crossing of the gate lines 13 and the data lines 15. Furthermore, a pixel electrode 17 is formed on a sub-pixel region Ps defined by the gate lines 13 and the data lines 15 of the lower substrate 22. The pixel electrodes 17 are formed of a transparent conductive material (e.g., indium-tin-oxide; ITO) in a matrix type, and each pixel electrode 17 corresponds to each of the color filters 7a, 7b and 7c. The sub-pixel regions Ps are often referred to as dots, and are actually employed for displaying images with the corresponding color filters by the modulation of the liquid crystal layer 14.

A scanning signal is supplied to a gate electrode of the thin film transistor T through the gate line 13, and a data signal is supplied to a source electrode of the thin film transistor T through the data line 15. As a result, the liquid crystal molecules of the liquid crystal material layer 14 are aligned and re-arranged by enablement of the electric field between the common electrode 18 and the pixel electrodes 17. The liquid crystal molecules of the liquid crystal layer 14 have a spontaneous polarization property such that the liquid crystal arrangement changes in accordance with the electric field when voltages are applied to the pixel and common electrodes 17 and 18. The re-arrangement of the liquid crystal molecules acts as photo modulation that shuts and opens incident light passing through the liquid crystal layer 14, thereby displaying desired images. Further, the LCD device includes driving circuitries, wherein the circuitries control and change RGB data and other control signals originating from the driving system into desired signals in order to enable the liquid crystal panel to display the color images.

FIG. 2 is a schematic block diagram illustrating the liquid crystal display device according to the related art. In FIG. 2, a liquid crystal display (LCD) device 100 includes a liquid crystal (LC) panel 120 and a driving circuit 130. The LC panel 120 includes a plurality of gate lines 122 and a plurality of data line 124. The gate lines 122 perpendicularly cross the data lines 124 to define sub-pixel region Ps with the data lines 124. A switching element T, e.g., a thin film transistor, is disposed near a crossing of the gate and data lines 122 and 124 and connected to the gate and data lines 122 and 124. The driving circuit 130 normally receives RGB data and other control signals from a driving system (not shown), and then applies electric signals to the LC panel 120. The driving circuit 130 includes a timing controller 136, a gamma voltage generator 138, a gate driver 132 and a data driver 134. The gate driver 132 is connected to the plurality of gate lines 122 and supplies gate signals to the gate lines 122. The data driver 132 is connected to the plurality of data lines 124 and supplies data signals thereto.

In addition, the timing controller 136 transmits the RGB data and other control signals received from the driving system (not shown) to the data driver 134. The control signals are a plurality of timing synchronization signals that include a vertical synchronization signal as a frame identification, a horizontal synchronization signal as a line identification, an enable signal as a data input indicator, and a main clock. After receiving the timing synchronization signals, the timing controller 136 generates data control signals and gate control signals, respectively, and re-arranges the RGB data in accordance with the timing synchronization signals. Namely, the RGB digital data, a horizontal synchronization signals, a vertical line start signal for RGB digital data input, and source pulse clock for data shift are transferred to the data driver 134 from the timing controller 136. Furthermore, the timing controller 136 transmits a vertical synchronization signal, a vertical line start signal for gate-on-signal input, and a gate clock for sequential gate signal input into the gate driver 132. Additionally, the gamma voltage generator 138 generates an RGB reference voltage using the RGB data and transmits the RGB reference voltage to the data driver 134.

Meanwhile, when the LCD device displays moving images after displaying a still picture for a long time, some image patterns of the previous still picture remain occasionally, i.e., it is called as residual images. Especially, such residual images occur at the time of applying DC voltage between the common and pixel electrodes because the liquid crystal has refractive birefringence property and is easily deteriorated by the DC voltage. Therefore, the liquid crystal layer is generally driven and operated by an AC voltage. Further, if the polarity of voltage applied to the pixel and common electrodes is fixed, the liquid crystal deterioration is further increased, whereby the applied voltage polarity may be converted for each frame with respect to the driving method. Specifically, one of a field inversion driving method, a line inversion driving method and a dot inversion driving method may be employed for converting the applied voltage polarity.

In the field inversion method, the data signal supplied to the LC panel is inverted whenever the field is changed. In the line inversion method, the data signal is inverted in accordance with the gate line of the LC panel. Further, in the dot inversion method, the data signal polarity of one pixel is opposite to that of adjacent pixels, and the data signal applied to the LC panel is inverted in each field. When adopting such inversion methods to the LCD device, the driving circuitry 130 of FIG. 2 may include a polarity applier (not shown). Among the inversion methods mentioned above, the dot inversion method is widely used because the dot inversion method most frequently changes the polarity.

Referring back to FIG. 1, the sub-pixel regions Ps correspond to the R, G and B color filters 7a, 7b and 7c, and the set of R, G and B color filters 7a, 7b and 7c form a pixel that represents a desired color by mixing the red (R), green (G) and blue (B) colors so as to display an image. If the LCD device of FIG. 1 adopts the dot inversion method, each sub-pixel has a polarity different from its neighboring pixels. Namely, the data signal is inverted for each of the R, G and B colors. At this point, the color filters 7a, 7b and 7c corresponding to the sub-pixel regions Ps are proposed to have the following arrangements.

Figure 4:
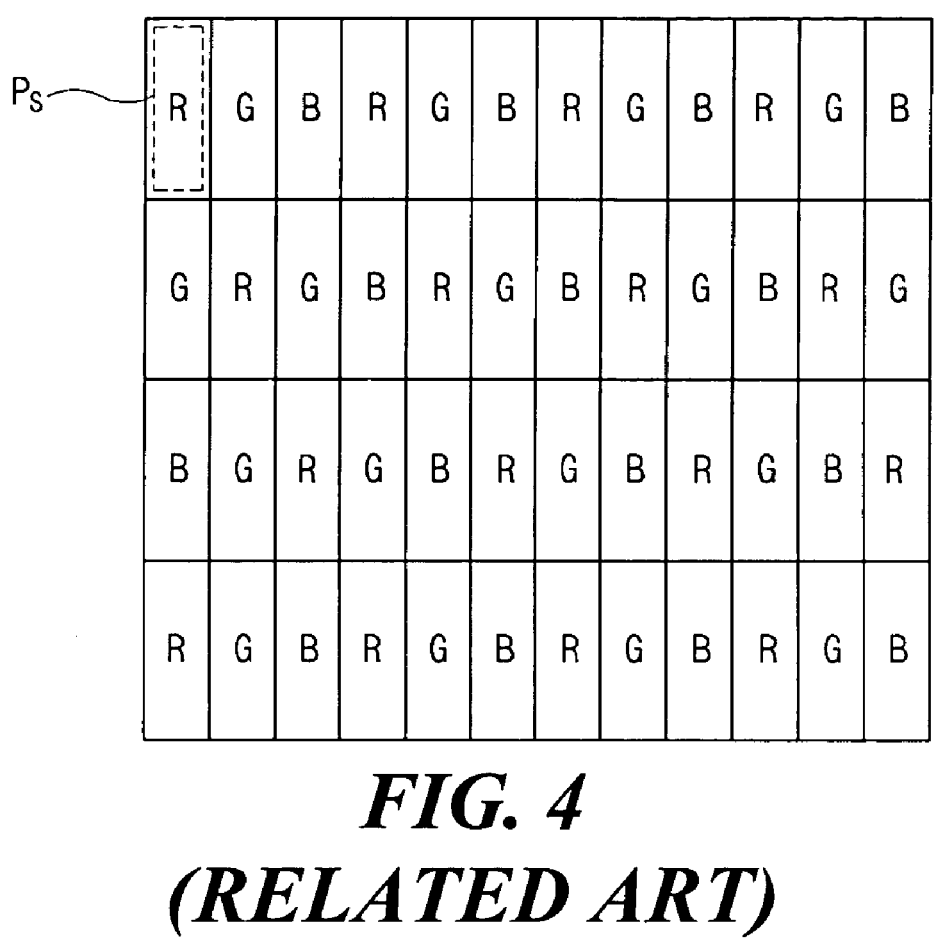
Figure 6:
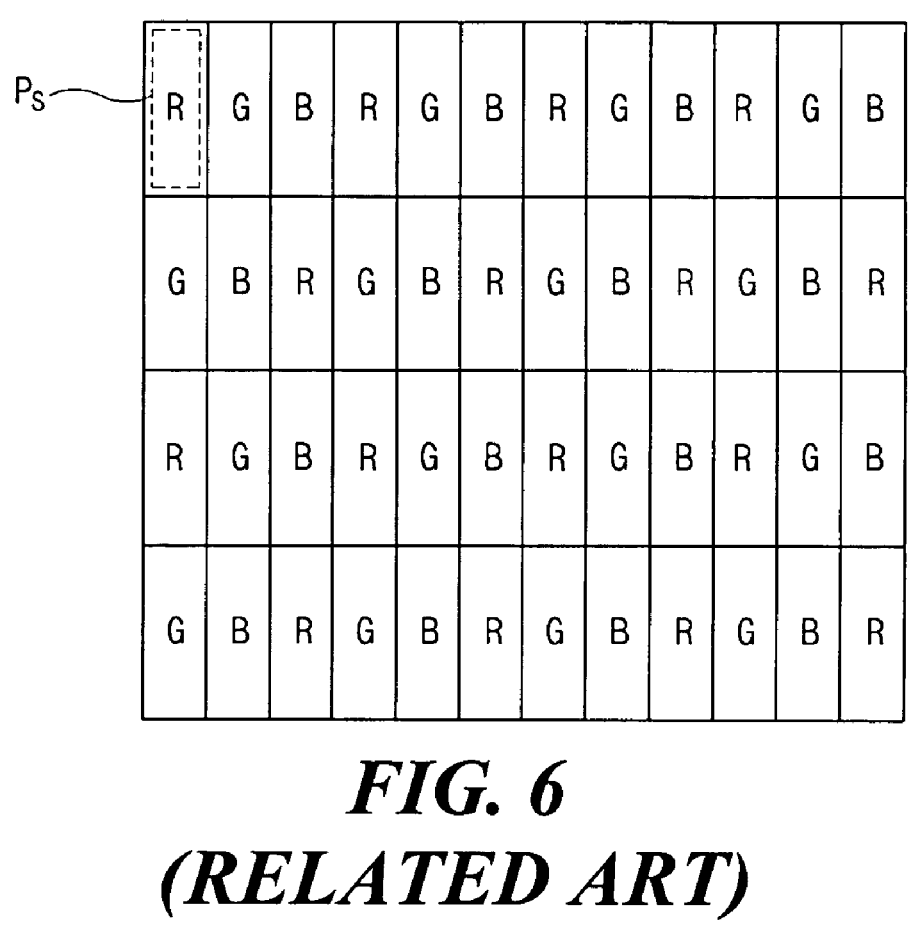
Figure 7:
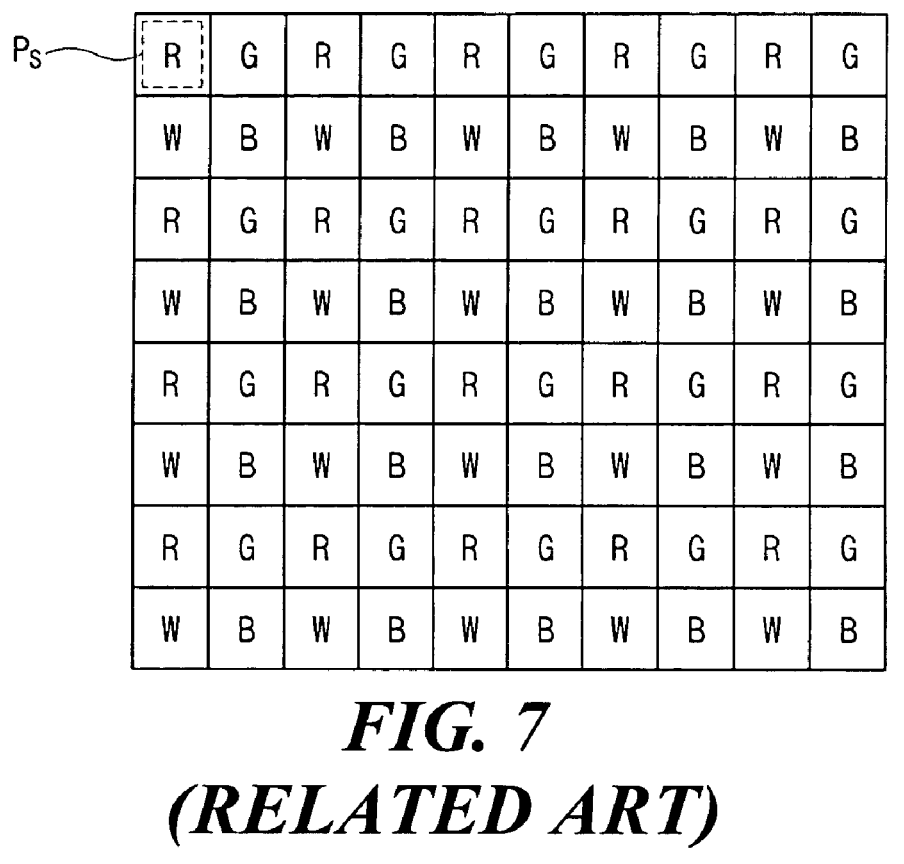

FIGS. 3-7 are plan views illustrating arrangements of sub-pixels: a stripe type, a mosaic type, a triangle type, a square type, and a quad type.

FIG. 3 shows a stripe type arrangement of color filters. In FIG. 3, the sub-pixel regions Ps line up uniformly in rows and columns. The red (R), green (G) and blue (B) color filters are alternately arranged in a row direction, but the same color filters, red (R), green (G) or blue (B), are also arranged in a column direction.

FIG. 4 shows a mosaic type arrangement of color filters. In FIG. 4, the sub-pixel regions Ps line up uniformly in rows and columns. However, unlike the stripe type arrangement of FIG. 3, the red (R), green (G) and blue (B) color filters are alternately arranged in both the row and column directions.

FIG. 5 shows a triangle type arrangement of color filters. In FIG. 5, the sub-pixel regions Ps line up in row, but the sub-pixels disposed in a column make a diagonal loop shape. The red (R), green (G) and blue (B) color filters are alternately arranged in the row direction. However, in the column direction, the red (R), green (G) and blue (B) color filters are arranged so as not to have the same colored filters attached together. Namely, if the red (R) and green (G) color filters are arranged to be attached to each other in a first row, the blue (B) color filter is positioned in an area between the red (R) and green (G) color filter in a second row. In this manner, the red (R) color filter of the second row is positioned in an area between the green (G) and blue (B) color filters of the first row, and the green (G) color filter of the second row is positioned in an area between the blue (B) and red (R) color filters of the first row. Therefore, the red (R) and green (G) color filters of the first row and the blue (B) color filter of the second row form a triangle shape. Hence the reason why the arrangement of FIG. 5 is called the triangle type.

FIG. 6 shows a square type arrangement of color filters. In FIG. 6, the sub-pixel regions Ps are drawn up uniformly in rows and columns. The red (R), green (G) and blue (B) color filters are alternately arranged in the row direction, but only two colored filters are alternately arranged in the column direction. For example, the red (R) and green (B), green (G) and blue (B), or blue (B) and red (R) color filters are alternately arranged along the column direction without the other colored filter.

FIG. 7 shows a quad type arrangement of color filters. In FIG. 7, white (W) color filters are included with the red (R), green (G) and blue (B) color filters. The sub-pixel regions Ps stand uniformly in rows and columns. The red (R), green (G), blue (B) and white (W) color filters are gathered together to form a larger rectangular shape. Namely, two of the red (R), green (G), blue (B) and white (W) color filters are alternately arranged in a first row, and the other two color filters are alternately arranged in a second row. Due to the fact that the white (W) color filter is additionally formed, the LCD device having the quad type arrangement of color filters can have improved brightness, high aperture ratio, and better contrast ratio. Further, the sub-pixel having the white (W) color filter may be operated by an additional data signal.

Meanwhile, the white (W) sub-pixels may not have any colored filters because a light source employed in the LCD device usually emits white-colored light.

Among the above-mentioned color filter arrangements, the stripe type, mosaic type, triangle type and square type arrangements provide relatively low brightness, and have the disadvantages of the invariable and stationary aperture and contrast ratios. Furthermore, although the high brightness and improved aperture and contrast ratios are obtained, the LCD device having the quad type arrangement needs a complicated circuit and requires the high costs of production because an additional data signal is required for the white (W) sub-pixel. Further, the LCD device having the red (R), green (G) and blue (B) color filters may have a narrower color gamut because only three colors, red, green and blue colors, are employed to display desired color images.

SUMMARY OF THE INVENTION

Accordingly, the present invention is directed to a liquid crystal display device automatically adjusting aperture ratio in each pixel that substantially obviates one or more of the problems due to limitations and disadvantages of the related art.

An advantage the present invention is to provide a liquid crystal display device that provides a high aperture ratio, a high brightness and an improved contrast ratio.

Another advantage of the present invention is to provide a liquid crystal display device that enlarges a color gamut.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device includes a first substrate including a plurality of pixels each having a white (W) sub-pixel and red (R), green (G), blue (B) and yellow (Y) sub-pixels surrounding the W sub-pixel; gate lines formed over the first substrate; data lines formed substantially perpendicular to and crossing the gate lines over the first substrate; thin film transistors connected to the gate and data lines over the first substrate; first to fourth pixel electrodes connected to each of the thin film transistors and corresponding to one of the R, G, B and Y sub-pixels; a color filter layer including red (R), green (G), blue (B) and yellow (Y) color filters on a second substrate, each of the R, G, B and Y color filters corresponding to one of the R, G, B and Y sub-pixels; a common electrode on the color filter layer; and a liquid crystal layer interposed between the color filter layer and the first to fourth pixel electrodes.

In another aspect, a liquid crystal display device includes a first substrate including a plurality of pixels each having a white (W) sub-pixel and red (R), green (G), blue (B) and yellow (Y) sub-pixels surrounding the W sub-pixel; gate lines formed over the first substrate; data lines formed substantially perpendicular to and crossing the gate lines over the first substrate; thin film transistors each connected to the gate and data lines over the first substrate; first to fourth pixel electrodes disposed in the respective R, G, B and Y sub-pixels over the first substrate and connected to the thin film transistors, wherein each of the first to fourth pixel electrodes has a substantially turbinated shape corresponding to a shape of one of the R, G, B and Y sub-pixels; common electrodes disposed in the respective R, G, B and Y sub-pixels over the first substrate and spaced apart from the respective first to fourth pixel electrode, wherein each of the common electrodes has a substantially turbinated shape corresponding to one of the first to fourth pixel electrodes; a color filter layer including red (R), green (G), blue (B) and yellow (Y) color filters on a second substrate, each of the R, G, B and Y color filters corresponding to one of the R, G, B and Y sub-pixels; and a liquid crystal layer interposed between the color filter layer and the first to fourth pixel electrodes.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIGS. 3-7 are plan views illustrating a stripe type, a mosaic type, a triangle type, a square type, and a quad type, respectively, arrangements of sub-pixels.

DETAILED DESCRIPTION OF THE PREFERRED EMBODIMENTS

Reference will now be made in detail to the illustrated embodiments of the present invention, examples of which are illustrated in the accompanying drawings. Wherever possible, the same reference number will be used throughout the drawings to refer to the same or like parts.

Figure 8:
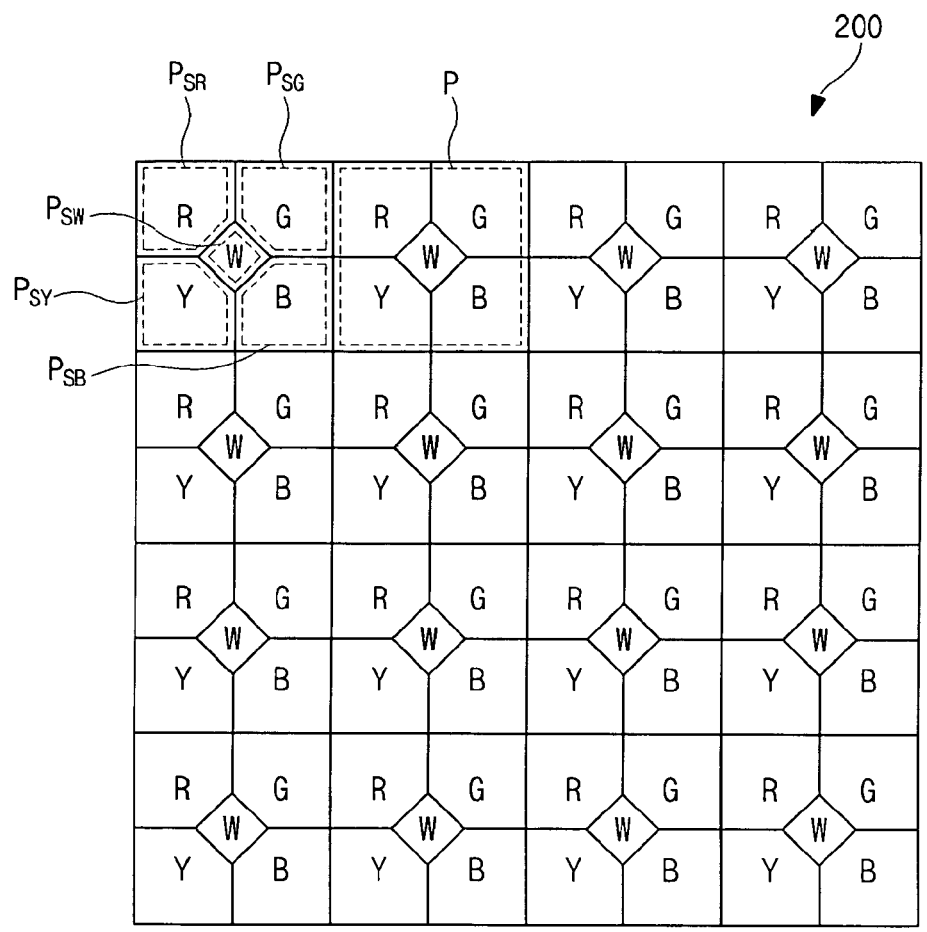
FIG. 8 is a plan view illustrating a sub-pixel arrangement of a liquid crystal display device according to the present invention.

FIG. 8 is a plan view illustrating a sub-pixel arrangement of a liquid crystal display device according to the present invention. Gate lines, data lines and thin film transistors are omitted in the sub-pixels of FIG. 8 to simply explanation.

In FIG. 8, a liquid crystal display (LCD) device 200 includes a plurality of pixels P each displaying a certain color. Each of the pixels P includes red (R), green (G), blue (B), yellow (Y) and white (W) sub-pixels $P_{SR}$, $P_{SG}$, $P_{SB}$, $P_{SY}$ and $P_{SW}$ each representing red, green, blue, yellow and white colors. Each of the R, G, B and Y sub-pixels $P_{SR}$, $P_{SG}$, $P_{SB}$, and $P_{SY}$ is substantially shaped like a rectangle and has a corner-cut side at one corner thereof. The R, G, B and Y sub-pixels $P_{SR}$, $P_{SG}$, $P_{SB}$, and $P_{SY}$ are arranged to form a square, such that the corner-cut sides of the R and B sub-pixels PSR and PSB and the corner-cut sides of the G and Y sub-pixels $P_{SG}$ and $P_{SY}$ face each other, respectively. The W sub-pixel $P_{SW}$ is positioned in a center portion of the pixel P, which is defined by the corner-cut sides of the R, G, B and Y sub-pixels $P_{SR}$, $P_{SG}$, $P_{SB}$, and $P_{SY}$. The W sub-pixel $P_{SW}$ has a substantially diamond shape. Although FIG. 8 shows that the R sub-pixel $P_{SR}$ faces the B sub-pixel $P_{SB}$, it may also face the G sub-pixel $P_{SG}$ or the Y sub-pixel $P_{SY}$ across the W sub-pixel $P_{SW}$.

As compared to the related art shown in FIGS. 3-7, since the LCD device 200 of FIG. 8 further includes the yellow (Y) sub-pixels $P_{SW}$ displaying yellow color, the color gamut of the LCD device 200 has an advantage of being broadening. Moreover, when the LCD device 200 of FIG. 8 is operated by the dot inversion method described above, the voltages applied to the pixel electrodes (not shown) of the R, G, B and Y sub-pixels $P_{SR}$, $P_{SG}$, $P_{SB}$, and $P_{SY}$ generate and induce an indirect electric field in the W sub-pixel $P_{SW}$, whereby the liquid crystal layer (not shown) corresponding to the W sub-pixels $P_{SW}$ is aligned by the indirect electric field. As a result, the brightness and aperture ratio of each pixel P is automatically adjustable based on the displayed color, and the contrast ratio is enhanced within one frame, thereby improving the picture quality of the LCD device.

Figure 1:
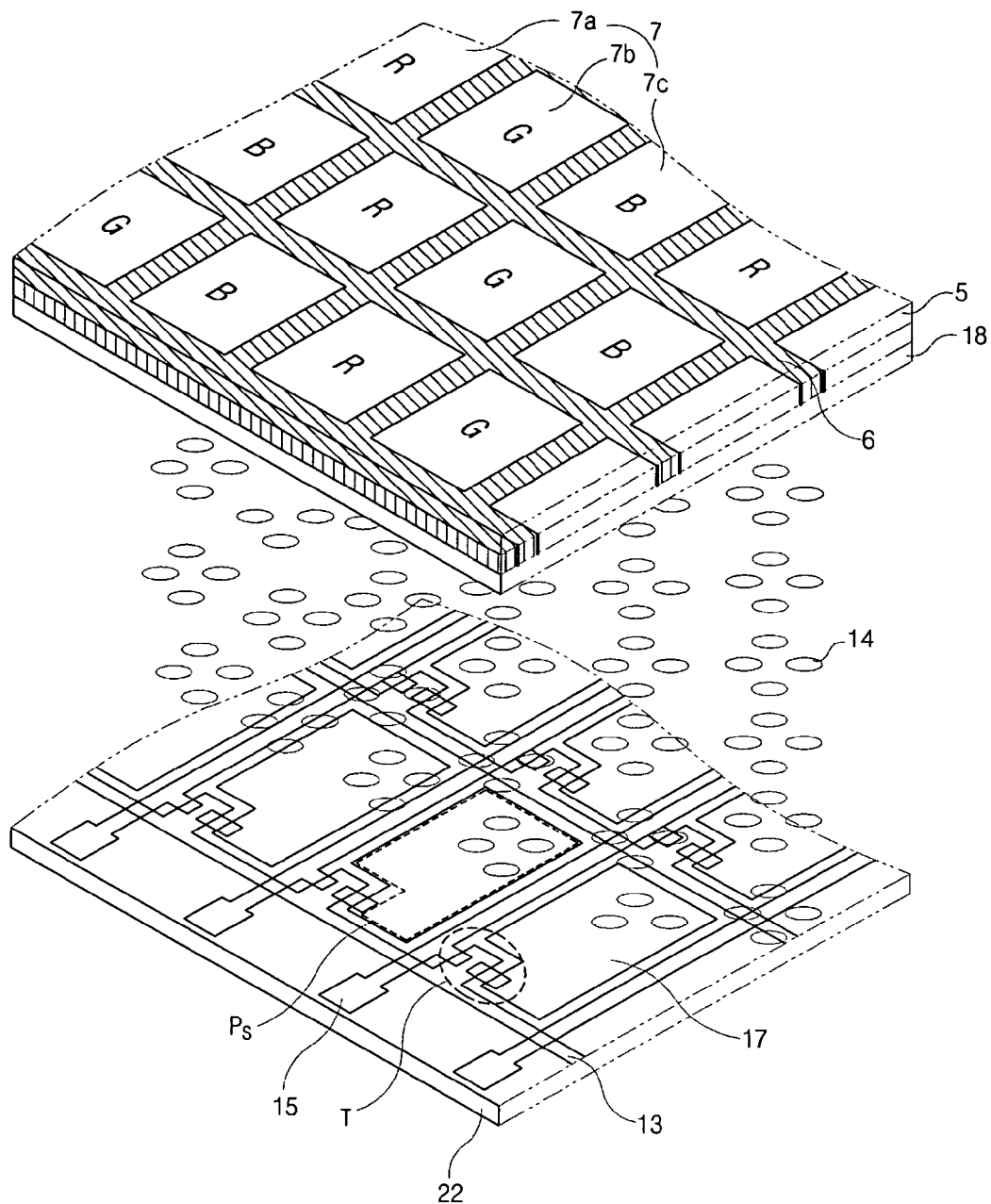
FIG. 1 is an expanded perspective view of a liquid crystal display device according to the related art.
Figure 2:
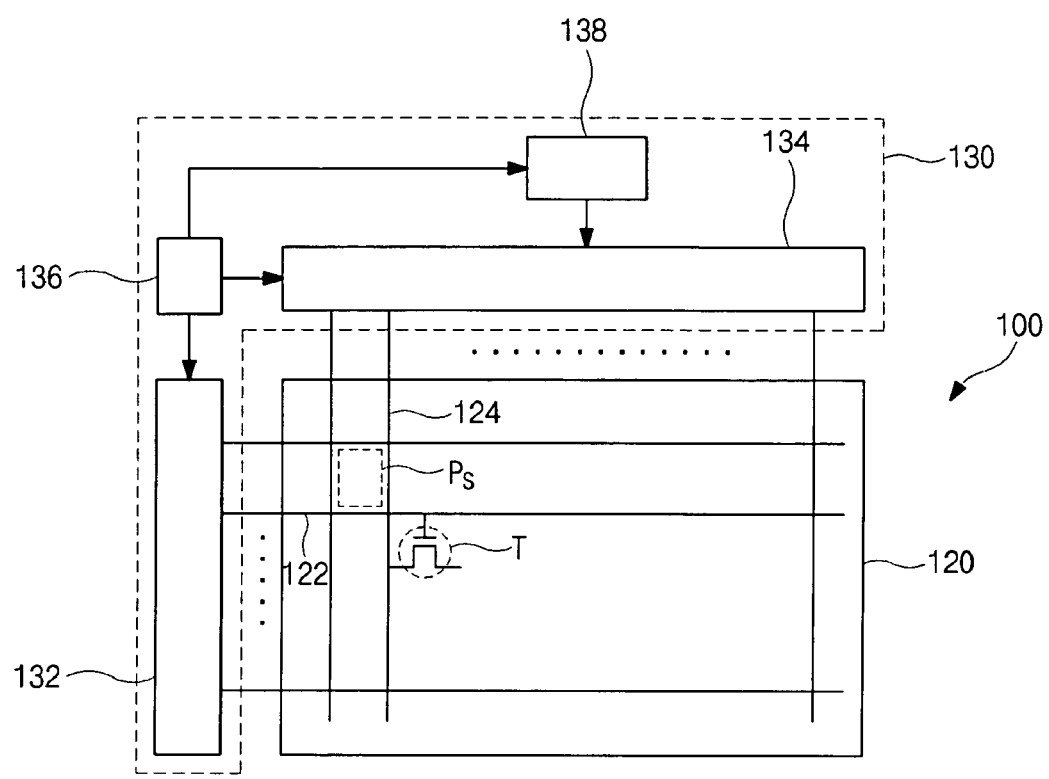
FIG. 2 is a schematic block diagram illustrating the liquid crystal display device according to the related art.
Figure 3:
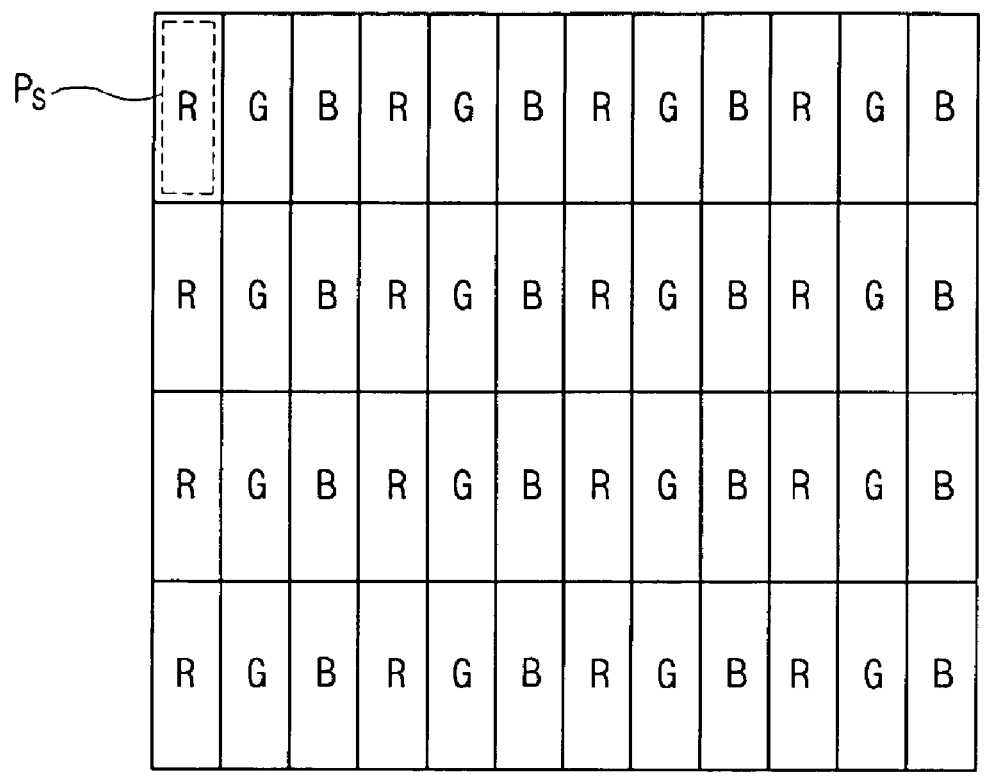
Figure 5:
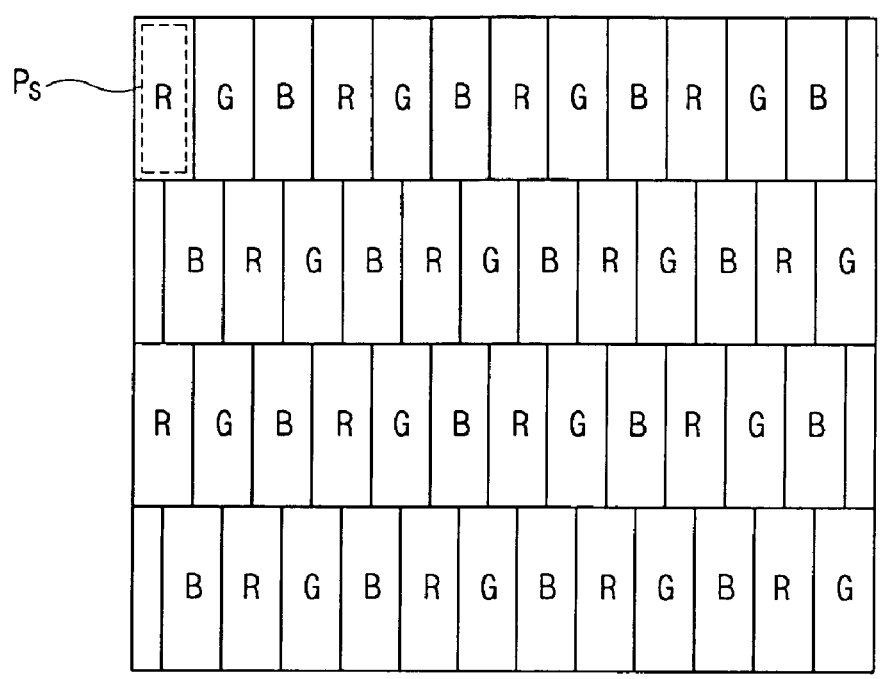

Although not shown in the present invention, the LCD device 200 has a cross-sectional view similar to that shown in FIG. 1. For example, the LCD device 200 may have a first substrate that includes gate lines, data lines, thin film transistors and pixel electrodes, and a second substrate that includes a black matrix, a color filter layer and a common electrode. Also, a liquid crystal layer may be interposed between the first and second substrates.

Figure 9:
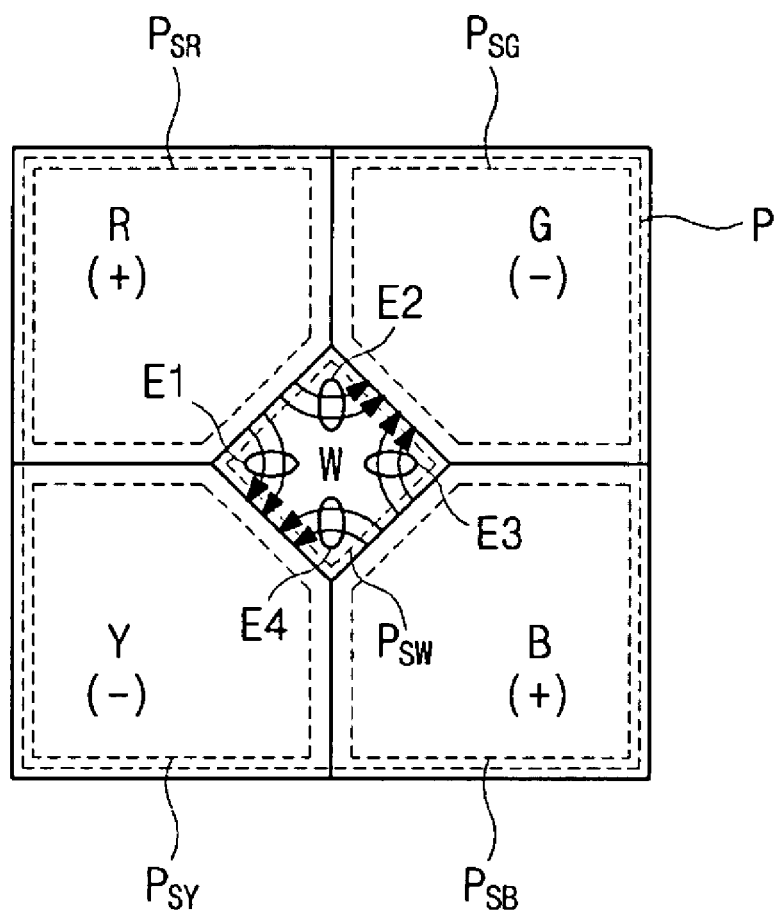
FIG. 9 is a plan view illustrating an exemplary operation of one pixel of the LCD device according to the present invention.

FIG. 9 is a plan view illustrating an exemplary operation of one pixel of the LCD device according to the present invention. The exemplary pixel of FIG. 9 is driven by the dot inversion method.

In FIG. 9, a pixel P includes red (R), green (G), blue (B), yellow (W) and white (W) sub-pixels $P_{SR}$, $P_{SG}$, $P_{SB}$, $P_{SY}$ and $P_{SW}$ which display red, green, blue, yellow and white colors, respectively. When displaying desired colors, pixel electrodes corresponding to the red (R), green (G), blue (B) and yellow (Y) sub-pixels $P_{SR}$, $P_{SG}$, $P_{SB}$ and $P_{SY}$ receive positive (+) and negative (−) voltages (i.e., data signals). Namely, the positive (+) and negative (−) voltages are alternately and repeatedly applied to the red (R), green (G), blue (B) and yellow (Y) sub-pixels $P_{SR}$, $P_{SG}$, $P_{SB}$ and $P_{SY}$, except the white (W) sub-pixel $P_{SW}$. For example, when a positive (+) voltage is applied to the red (R) and blue (B) sub-pixels $P_{SR}$ and $P_{SB}$, a negative (−) voltage is applied to the green (G) and yellow (Y) sub-pixels $P_{SG}$ and $P_{SY}$.

Additionally in FIG. 9, the white (W) sub-pixel $P_{SW}$ of the present invention does not have any pixel electrode. Further, the white (W) sub-pixel $P_{SW}$ does not generate a direct electrode field that is directly produced by the corresponding pixel and common electrodes. However, indirect electric fields are produced in the white (W) sub-pixel $P_{SW}$ by the dot inversion operation because the voltages oppositely polarized to each other in the neighboring sub-pixels are applied to the pixel electrodes of the red (R), green (G), blue (B) and yellow (Y) sub-pixels $P_{SR}$, $P_{SG}$, $P_{SB}$ and $P_{SY}$. At this time, the white (W) sub-pixel $P_{SW}$ may have a transparent insulator instead of a white-colored filter.

In other words, when a positive (+) voltage is applied to the pixel electrode of the red (R) sub-pixel PSR and a negative (−) voltage is applied to the pixel electrode of the yellow (Y) sub-pixel $P_{SY}$, a first electric field E1 is formed in the white (W) sub-pixel $P_{SW}$ between the corner-cut sides of the red (R) and yellow (Y) sub-pixels $P_{SR}$ and $P_{SY}$. Furthermore, when a positive (+) voltage is applied to the pixel electrode of the red (R) sub-pixel $P_{SR}$ and a negative (−) voltage is applied to the pixel electrode of the green (G) sub-pixel $P_{SG}$, a second electric field E2 is formed in the white (W) sub-pixel $P_{SW}$ between the corner-cut sides of the red (R) and green (G) sub-pixels $P_{SR}$ and $P_{SG}$. In this manner, a third electric field E3 is formed between the corner-cut sides of the blue (B) and green (G) sub-pixels $P_{SB}$ and $P_{SG}$, and a fourth electric field E4 is formed between the corner-cut sides of the blue (B) and yellow (Y) sub-pixels $P_{SB}$ and $P_{SY}$. Namely, although the white (W) sub-pixel $P_{SW}$ does not have the pixel electrode, the white (W) sub-pixel $P_{SW}$ can have the first to fourth electric fields E1-E4 produced by the pixel electrodes of the neighboring sub-pixels $P_{SR}$, $P_{SG}$, $P_{SB}$ and $P_{SY}$. Therefore, the liquid crystal layer corresponding to the white (W) sub-pixel $P_{SW}$ may have different transmissivities in each pixel in accordance with the first to fourth electric fields E1-E4.

Figure 10:
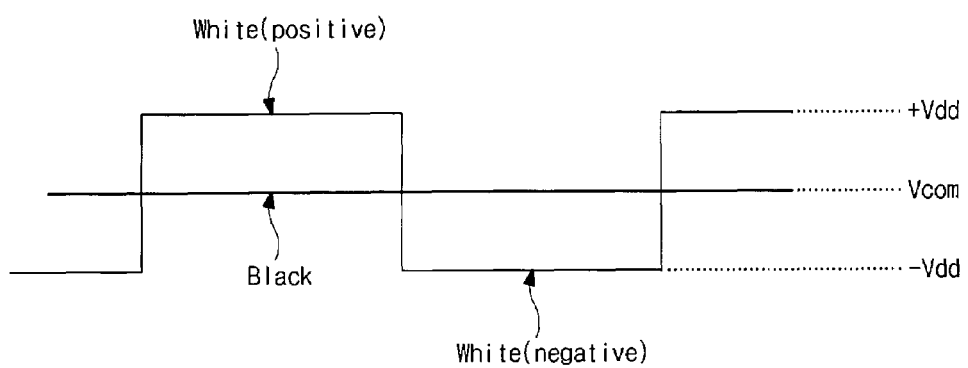
FIG. 10 illustrates a data signal applied to the liquid crystal display device of FIG. 8.
Figure 11A:
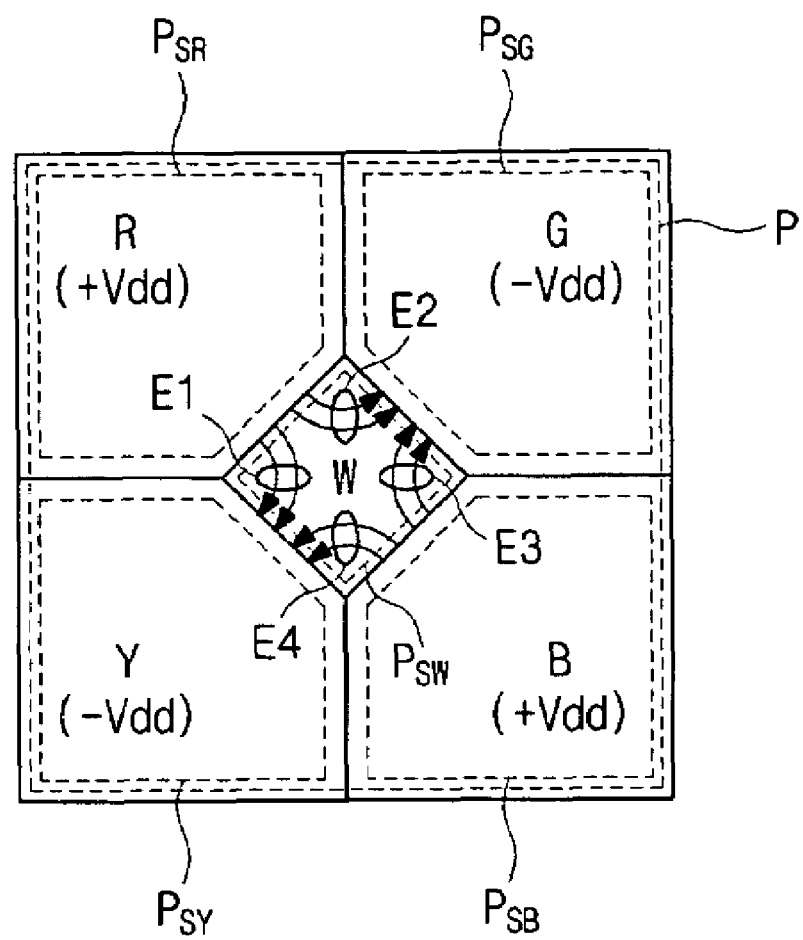
FIGS. 11A and 11B illustrate pixel operation when the LCD device of FIG. 8 displays white and black colors, respectively.
Figure 11B:
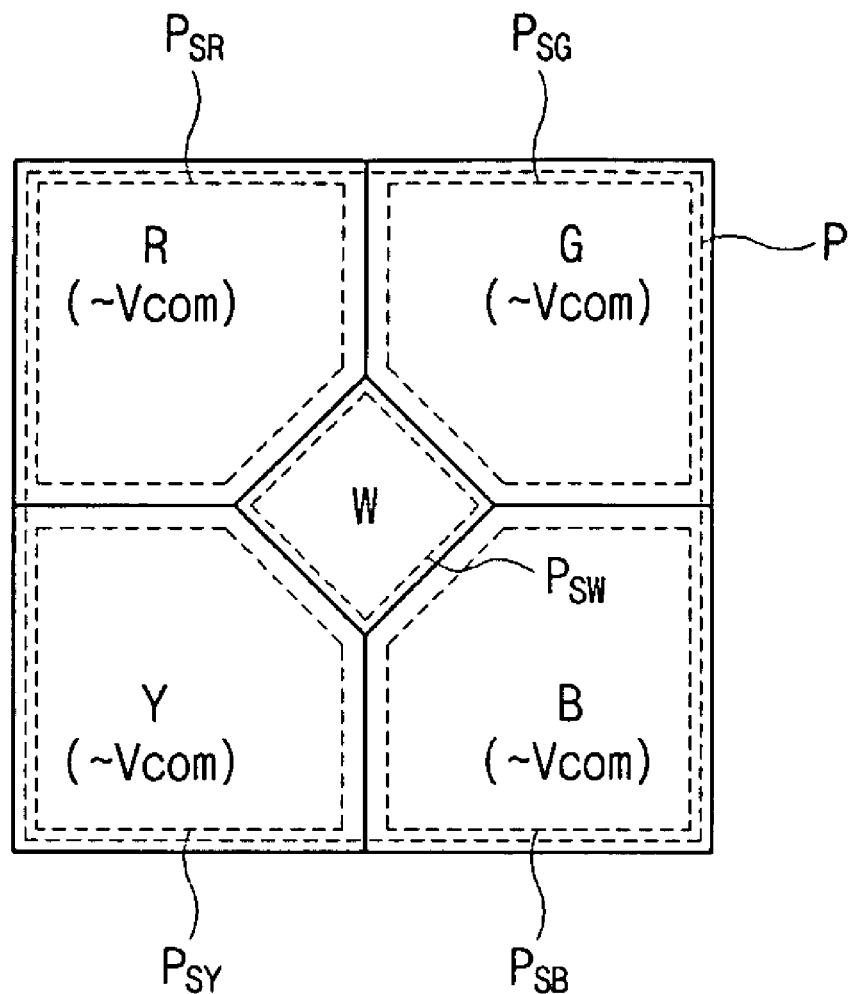

FIG. 10 illustrates a data signal applied to the liquid crystal display device of FIG. 8, and FIGS. 11A and 11B illustrates pixel operation when the LCD device of FIG. 8 displays white and black colors, respectively. At this time, the LCD device is assumed to be operable in a normally black mode and driven by a dot inversion method.

As shown in FIG. 10, when the LCD device displays the white color, a data signal having a high voltage (+Vdd) (i.e., a positive (+) property) and a low voltage (−Vdd) (i.e., a negative property) is applied to the sub-pixels. Since the LCD device is driven by the dot inversion method, each sub-pixel receives the positive (+) voltage (+Vdd) and the negative voltage (−Vdd), respectively. In contrast, when the LCD device displays the black color, the data signal that is the same value as the common voltage (Vcom) is applied to all sub-pixels.

When the pixel displays the white color as shown in FIG. 11A, the pixel electrodes (not shown) of the red (R), green (G), blue (B) and yellow (Y) sub-pixels $P_{SR}$, $P_{SG}$, $P_{SB}$ and $P_{SY}$ receive the positive (+) high voltage data signal (+Vdd) and the negative (−) low voltage data signal (−Vdd). Particularly, the red (R) and blue (B) sub-pixels PSR and PSB receive the positive (+) high voltage data signal (+Vdd) and the green (G) and yellow (Y) sub-pixels PSG and PSY receive the negative (−) high voltage data signal (−Vdd), and vice versa. Therefore, there is a voltage difference of 2Vdd between the red (R) and yellow (Y) sub-pixels $P_{SR}$ and $P_{SY}$ because the red (R) and yellow (Y) sub-pixels $P_{SR}$ and $P_{SY}$ have the opposite voltage value of +Vdd and −Vdd. Due to this voltage difference of 2Vdd, the first electric field E1 is generated in the white (W) sub-pixel $P_{SW}$ as shown in FIG. 11A. In this manner, the second to fourth electric fields E2-E4 are formed in the white (W) sub-pixel $P_{SW}$ due to the voltage difference of 2Vdd between the red (R) and green (G) sub-pixels $P_{SR}$ and $P_{SG}$, between the green (G) and blue (B) sub-pixels $P_{SG}$ and $P_{SB}$, and between the blue (B) and yellow (Y) sub-pixels $P_{SB}$ and $P_{SY}$. As a result, the liquid crystal layer corresponding to the white (W) sub-pixel $P_{SW}$ can be driven by the first to fourth electric field E1-E4 to let incident light be transmitted, although the white (W) sub-pixel $P_{SW}$ does not have the pixel electrode.

When the pixel displays the black color as shown in FIG. 11B, the pixel electrodes (not shown) of the red (R), green (G), blue (B) and yellow (Y) sub-pixels $P_{SR}$, $P_{SG}$, $P_{SB}$ and $P_{SY}$ receive a data signal having the same value as the common voltage Vcom. Therefore, there is no voltage difference among the pixel electrodes of the red (R), green (G), blue (B) and yellow (Y) sub-pixels $P_{SR}$, $P_{SG}$, $P_{SB}$ and $P_{SY}$, and an electric field is not generated in the white (W) sub-pixel $P_{SW}$. The liquid crystal layer corresponding to the white (W) sub-pixel $P_{SW}$ blocks the incident light.

In conclusion, the liquid crystal display device of the present invention is capable of greatly increasing the brightness and aperture ratio by operating the liquid crystal layer corresponding to white (W) sub-pixel $P_{SW}$ when displaying white-colored images. Further, the liquid crystal display device of the present invention is capable of reducing the brightness and aperture ratio by not operating the liquid crystal layer corresponding to the white (W) sub-pixel $P_{SW}$ when displaying the black-colored images. Namely, it is possible in the present invention that a whitish color becomes whiter and a blackish color becomes blacker. Further, since the brightness and aperture ratio is automatically adjusted in each pixel P by the data signals applied to the pixel electrodes of the red (R), green (G), blue (B) and yellow (Y) sub-pixels $P_{SR}$, $P_{SG}$, $P_{SB}$ and $P_{SY}$, the contrast ratio is also automatically adjustable in each frame.

Figure 12:
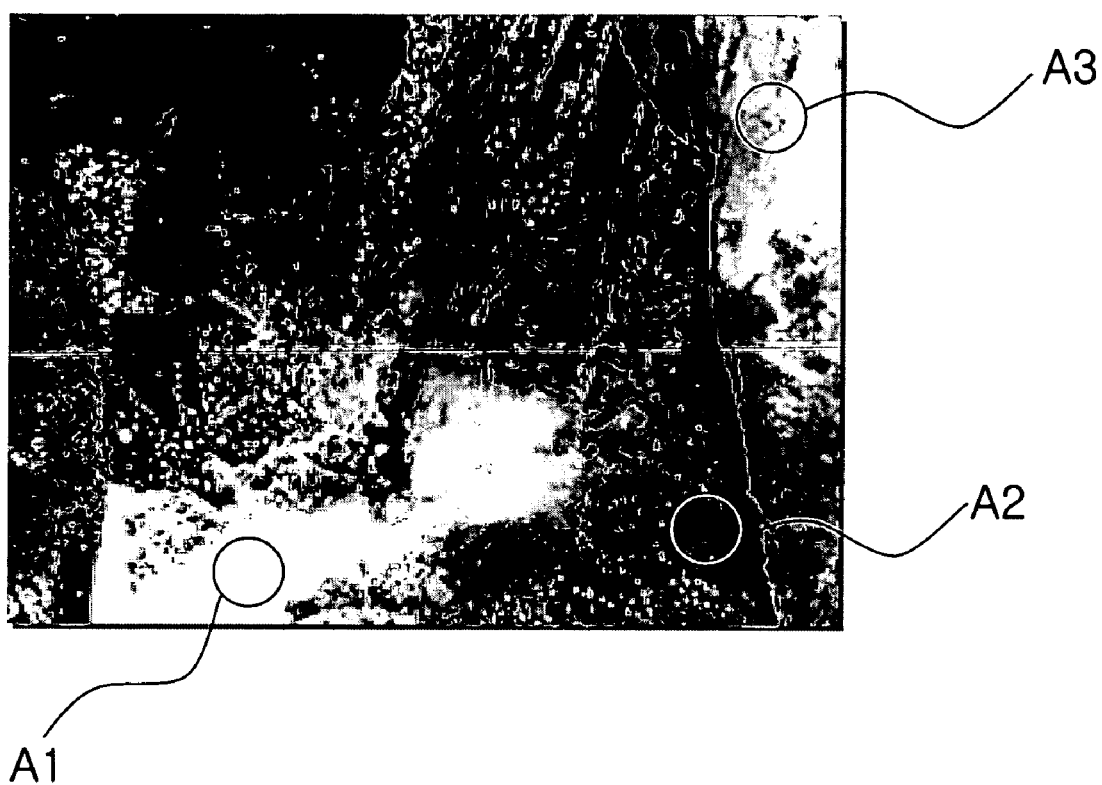
FIG. 12 is an exemplary picture displayed in the liquid crystal display device of the present invention.
Figure 13A:
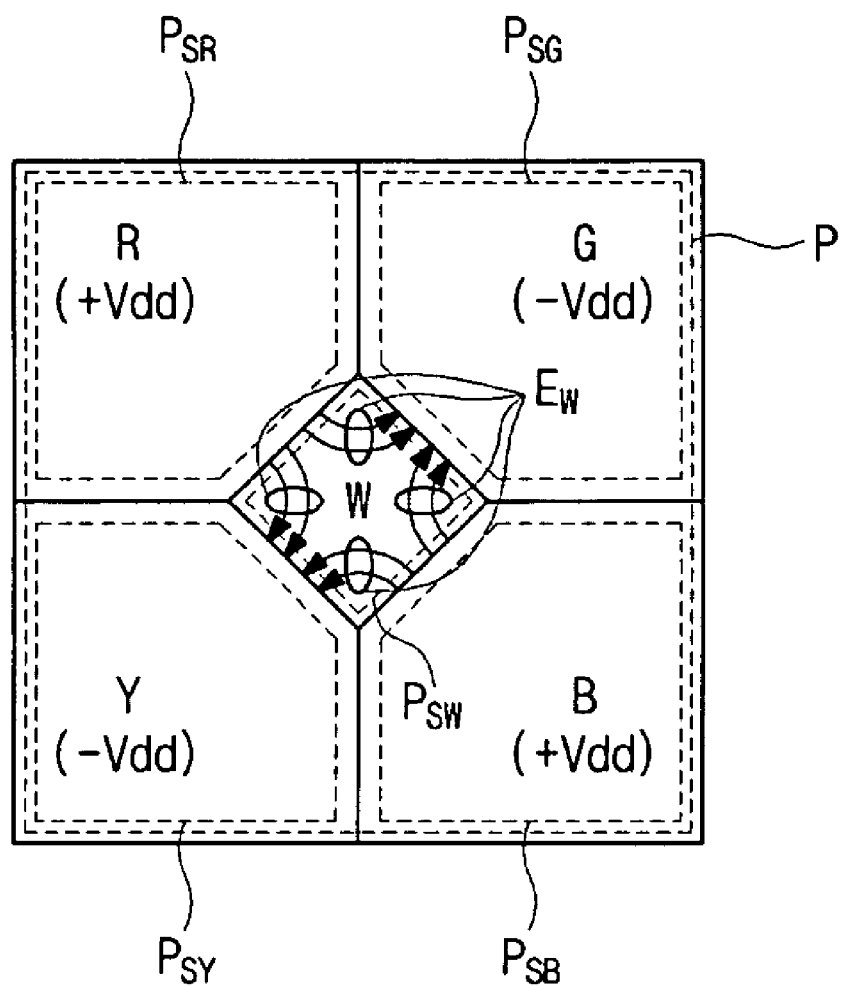
FIGS. 13A-13C illustrate pixels selected in portions A1-A3 of FIG. 12, respectively.
Figure 13B:
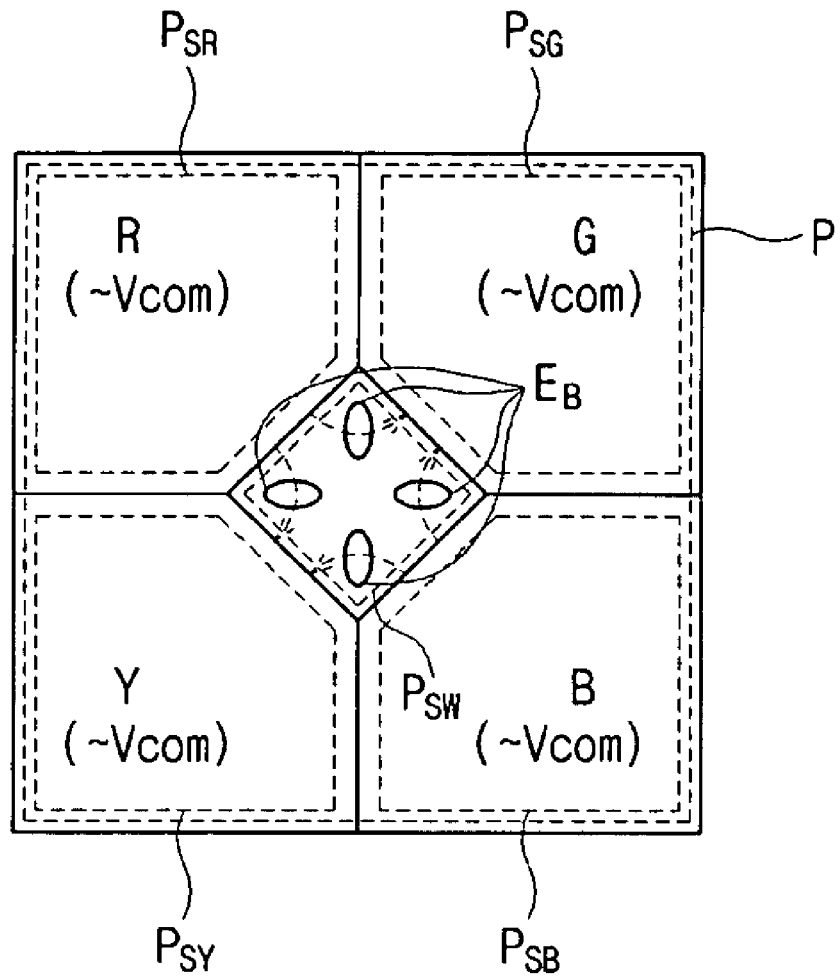
Figure 13C:
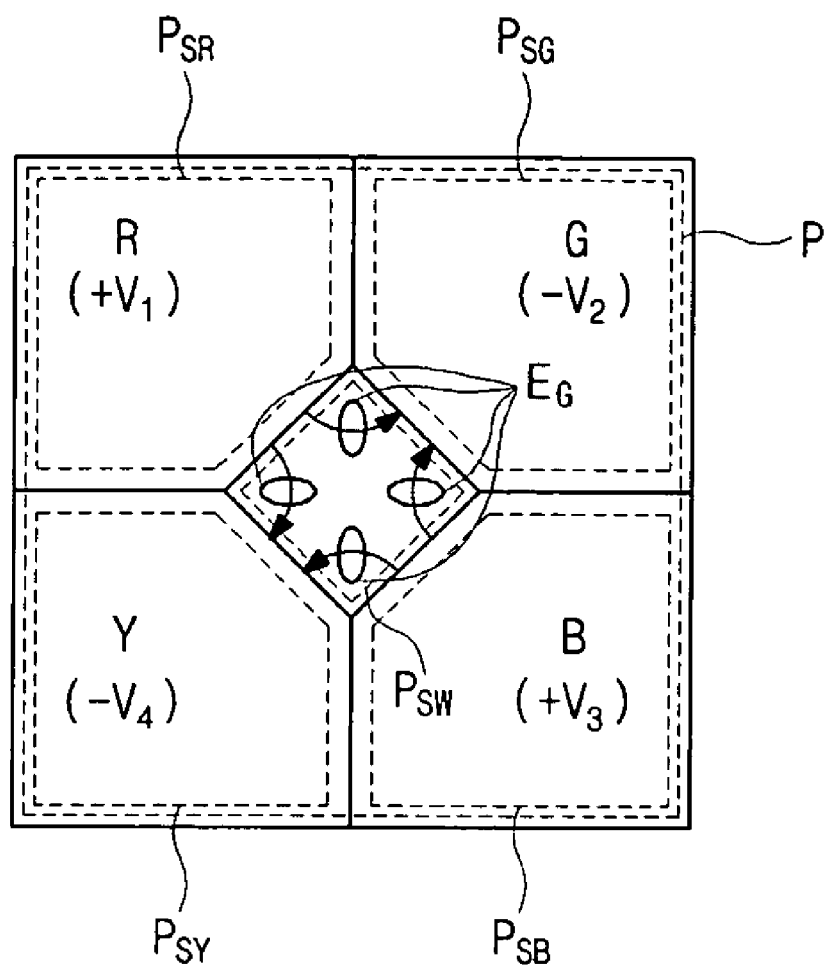

FIG. 12 is a picture displayed in the liquid crystal display device of the present invention, and FIGS. 13A-13C illustrate pixels selected in portions A1-A3 of FIG. 12.

In FIG. 12, the first portion A1 shows a white color, the second portion A2 shows a black color, and the third portion A3 shows a gray color. As described herein before, the positive (+) high voltage (+Vdd) and negative (−) low voltage (−Vdd) are applied to the pixels displaying the white color, e.g., the first portion A1, and the common voltage Vcom is applied to the pixels displaying the black color, e.g., the second portion A2. When displaying the gray color, e.g., the third portion A3, the pixel electrodes of the sub-pixels may receive positive (+) or negative (−) voltages, wherein the absolute value of such positive (+) or negative (−) voltage is greater than that of the common voltage Vcom and less than that of the positive (+) high voltage (+Vdd) or the negative (−) low voltage (−Vdd).

FIGS. 13A and 13B illustrate the white and black displaying pixels, e.g., the portions A1 and A2, respectively. When displaying the white color as shown in the portion A1 of FIG. 12 and depicted in FIG. 13A, there is a voltage difference of 2Vdd between the neighboring two sub-pixels. However, when displaying the black color as shown in the portion A2 and depicted in FIG. 13B, there is no voltage difference among the red (R), green (G), blue (B) and yellow (Y) sub-pixels $P_{SR}$, $P_{SG}$, $P_{SB}$ and $P_{SY}$. Thus, the most powerful electric field $E_W$ (FIG. 13A) is formed in the white (W) sub-pixel $P_{SW}$ in the first portion A1 displaying the white, and the liquid crystal layer corresponding to the white (W) sub-pixel $P_{SW}$ is operated to transmit the light. The most weak electric field $E_B$ (FIG. 13B) is formed in the white (W) sub-pixel $P_{SW}$ in the second portion A2 displaying the black, and the liquid crystal layer corresponding to the white (W) sub-pixel $P_{SW}$ is operated to block the light.

Meanwhile, in the third portion, A3, displaying the gray color, the pixel electrodes of the red (R), green (G), blue (B) and yellow (Y) sub-pixels $P_{SR}$, $P_{SG}$, $P_{SB}$ and $P_{SY}$ receive first to fourth voltages $+V_1$, $-V_2$, $+V_3$ and $-V_4$, respectively, as shown in FIG. 13C, which have positive (+) and negative (−) properties. The absolute value of the first to fourth voltages $+V_1$, $-V_2$, $+V_3$ and $-V_4$ is greater than that of common voltage Vcom and less than the high voltage (reference Vdd of FIG. 10), for example, Vcom<$V_1$<Vdd, Vcom<$V_2$<Vdd, Vcom<$V_3$<Vdd, and Vcom<$V_4$<Vdd. Therefore, when the pixel P displays the gray color, the voltage difference ($V_1+V_4$) between the red (R) and yellow (Y) sub-pixels $P_{SR}$ and $P_{SY}$ is greater than 0V and less than 2Vdd (i.e., 0<($V_1+V_4$)<2Vdd). In this manner, the voltage difference between the red (R) and green (G) sub-pixels $P_{SR}$ and $P_{SG}$ is 0<($V_1+V_2$)<2Vdd, the voltage difference between the green (G) and blue (B) sub-pixels $P_{SG}$ and $P_{SB}$ is 0<($V_2+V_3$)<2Vdd, and the voltage difference between the blue (B) and yellow (Y) sub-pixels $P_{SB}$ and $P_{SY}$ is 0<($V_3+V_4$)<2Vdd. As a result, when displaying a color having the gray scale between the black and white, an electric field $E_G$ that is greater than the most weak electric field $E_B$ and less than the most powerful electric field $E_W$ (i.e., $E_B<E_G<E_W$) is formed in the white (W) sub-pixel $P_{SW}$. At this time, the liquid crystal layer corresponding to the white (W) sub-pixel $P_{SW}$ of the third portion A3 is operable to transmit the light at an amount of more than the second portion A2 and less than first portion A1. Namely, the third portion A3 displaying the color having the gray scale between the black and white automatically provides intermediate brightness and aperture ratio.

In conclusion, since the liquid crystal display device of the present invention has the white (W) sub-pixel $P_{SW}$ providing the indirect electric field to the corresponding liquid crystal layer, the brightness and aperture ratio are automatically adjusted in each pixel P based on the pixel's gray scale. Therefore, the contrast ratio is increased in the displayed picture, and the picture quality is improved.

Figure 14:
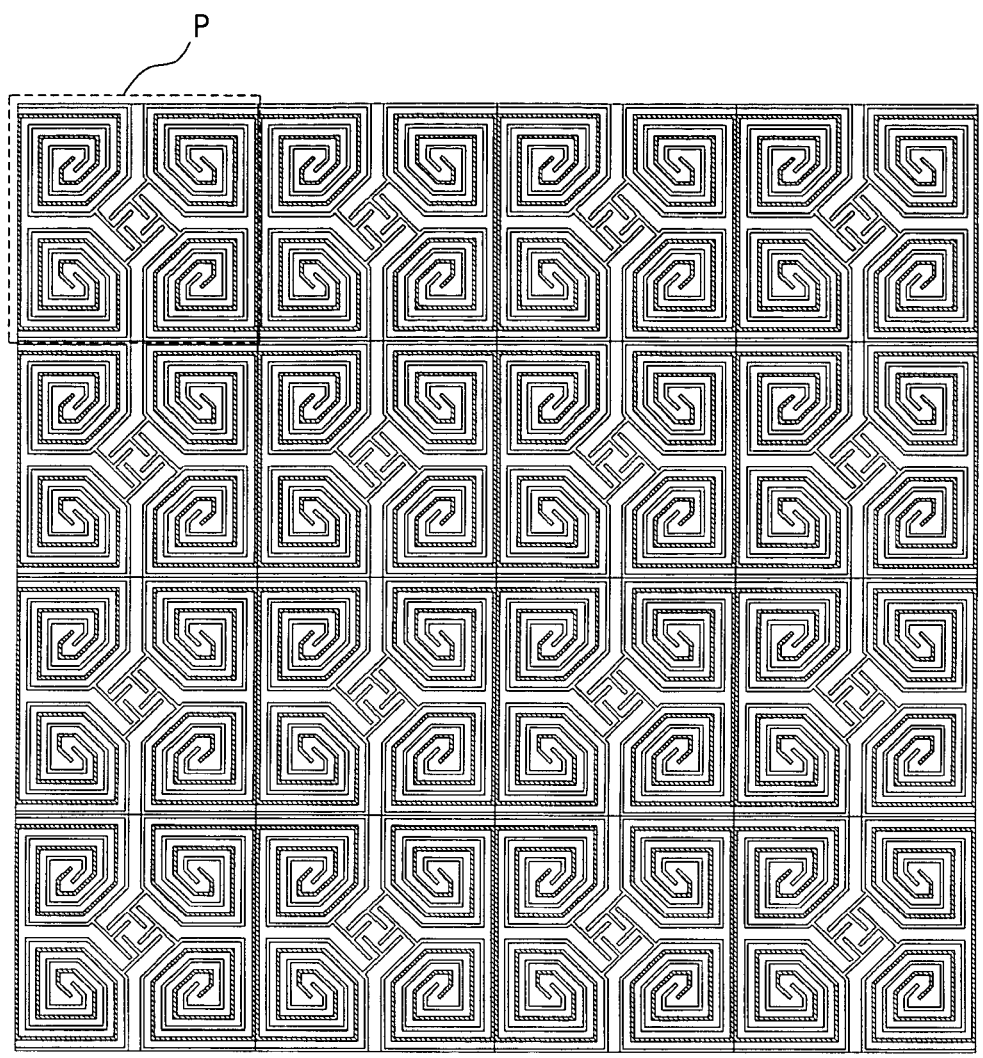
FIG. 14 is a plan view illustrating an exemplary structure of pixel and common electrodes according to the present invention.
Figure 15:
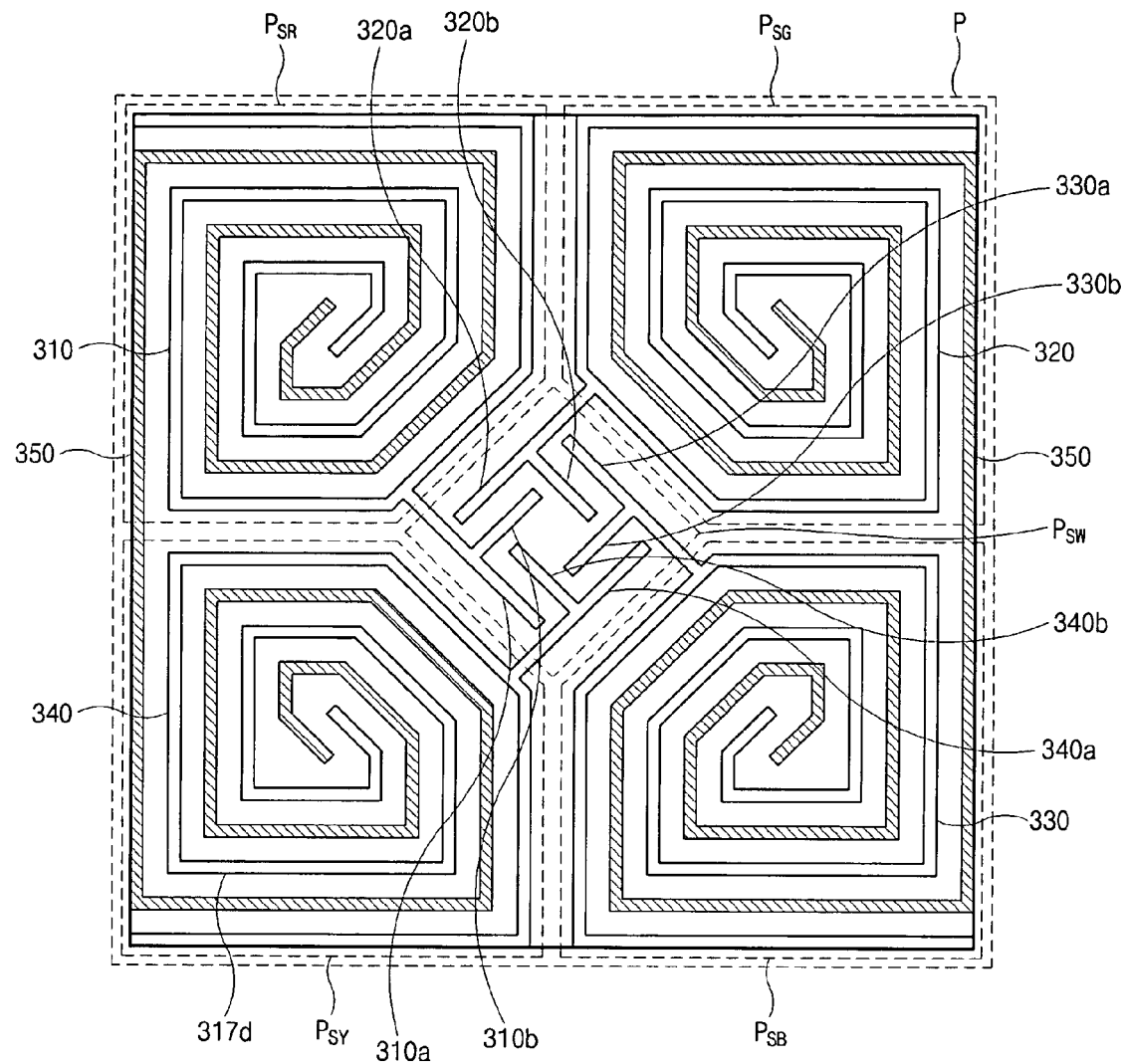
FIG. 15 is a plan view illustrating one pixel of FIG. 14.

FIG. 14 is a plan view illustrating an exemplary structure of pixel and common electrodes according to the present invention, and FIG. 15 is a plan view illustrating one pixel of FIG. 14. The LCD device of FIGS. 14 and 15 is an example of an In-Plane Switching Mode (IPS-Mode).

In FIGS. 14 and 15, each pixel P includes the red (R), green (G), blue (B), yellow (Y) and white (W) sub-pixels $P_{SR}$, $P_{SG}$, $P_{SB}$, $P_{SY}$ and $P_{SW}$. The R sub-pixel $P_{SR}$ includes first pixel and common electrodes 310 and 350 that are alternately disposed in a turbinated shape along the sub-pixel's shape. Additionally, the G, B and Y sub-pixels $P_{SG}$, $P_{SB}$ and $P_{SY}$ include second to fourth pixel electrodes 320, 330 and 340, and the common electrode 350, respectively. The second to fourth pixel electrodes 320, 330 and 340 are also disposed in an alternating pattern with the corresponding common electrode 350 and in the shape of spiral along the corresponding sub-pixel's shape. The out most portion of each of the first to fourth pixel electrodes 310, 320, 330 and 340 may produce an indirect electric field in the W sub-pixel $P_{SW}$, as described herein above. However, the LCD device shown in FIGS. 14 and 15 further includes first auxiliary pixel electrodes 310a, 320a, 330a and 340a and second auxiliary pixel electrodes 310b, 320b, 330b and 340b in the W sub-pixel $P_{SW}$ in order to improve operating ability of the W sub-pixel $P_{SW}$ to the corresponding liquid crystal layer. The first auxiliary pixel electrodes 310a, 320a, 330a and 340a extend from the first to fourth pixel electrodes 310, 320, 330 and 340, respectively, toward the W sub-pixel $P_{SW}$. Also, the second auxiliary pixel electrodes 310b, 320b, 330b and 340b extend from the first auxiliary pixel electrodes 310a, 320a, 330a and 340a, respectively. For example, the first auxiliary pixel electrode 310a is protruded substantially perpendicular from the first pixel electrode 310, the first auxiliary pixel electrode 320a substantially perpendicular from the second pixel electrode 320, the first auxiliary pixel electrode 330a substantially perpendicular from the third pixel electrode 330, and the first auxiliary pixel electrode 340a substantially perpendicular from the fourth pixel electrode 340. Further, the second auxiliary pixel electrodes 310b, 320b, 330b and 340b are protruded substantially perpendicular from the corresponding first auxiliary pixel electrodes 310a, 320a, 330a and 340a, respectively. Therefore, the first auxiliary pixel electrode 310a extending from the R sub-pixel PSR faces and is spaced apart from the second auxiliary pixel electrode 340b extending from the Y sub-pixel $P_{SY}$. Therefore, the first auxiliary electrode 310a extending from the R sub-pixel PSR forms an electric field with the second auxiliary electrode 340b extending from the Y sub-pixel $P_{SY}$. When displaying the white color, a voltage difference of 2Vdd exists between the first auxiliary pixel electrode 310a and the second auxiliary pixel electrode 340b, respectively, extending from the R and Y sub-pixels $P_{SR}$ and $P_{SY}$. When displaying the black color, there is no voltage difference between the separated first and second auxiliary pixel electrodes 310a and 340b. Additionally, when displaying a color having a gray scale between black and white, a voltage difference between the separated first and second auxiliary pixel electrode 310a and 340b ranges from about 0V to 2Vdd. As a result, the electric field generated between the first auxiliary pixel electrode 310a extending from the R sub-pixel $P_{SR}$ and the second auxiliary pixel electrode 340b extending from the Y sub-pixel $P_{SY}$ is automatically adjusted in each pixel P, and at this time, the light transmittance of the W sub-pixel $P_{SW}$ is variable based on the color the pixel P displays.

The above-mentioned operation can be adopted between the second auxiliary pixel electrode 310b extending from the R sub-pixel $P_{SR}$ and the first auxiliary pixel electrode 320a extending from the G sub-pixel $P_{SG}$, between the second auxiliary pixel electrode 320b extending from the G sub-pixel $P_{SG}$ and the first auxiliary pixel electrode 330a extending from the B sub-pixel $P_{SB}$, and between the second auxiliary pixel electrode 330b extending from the B sub-pixel $P_{SB}$ and the first auxiliary pixel electrode 340a extending from the Y sub-pixel $P_{SY}$.

In conclusion, the IPS-mode LCD device of the present invention has the W sub-pixel $P_{SW}$ that operates the corresponding liquid crystal layer by the indirect electric field formed between the first and second auxiliary pixel electrodes. Therefore, the brightness and aperture ratio are automatically adjusted based on the gray scale displayed in each pixel P. Further, the contrast ratio of the displayed picture is increased, and the picture quality is improved.

Meanwhile, the voltage difference (i.e., a first voltage difference) between one of the first auxiliary pixel electrodes 310a, 320a, 330a and 340a and the corresponding one of the second auxiliary pixel electrodes 310b, 320b, 330b and 340b may range from about 0V to 2Vdd. However, the voltage difference (i.e., a second voltage difference) between the common electrode 350 and the corresponding one of the first to fourth pixel electrodes 310, 320, 330 and 340 of the R, G, B and Y sub-pixels $P_{SR}$, $P_{SG}$, $P_{SB}$ and $P_{SY}$ may range from about 0V to Vdd. That is, the first voltage difference in the W sub-pixel $P_{SW}$ is greater then the second voltage difference in the other sub-pixels $P_{SR}$, $P_{SG}$, $P_{SB}$ and $P_{SY}$. Therefore, the electric field formed in the W sub-pixel $P_{SW}$ is much stronger than that formed in the R, G, B and Y sub-pixels $P_{SR}$, $P_{SG}$, $P_{SB}$ and $P_{SY}$, thereby increases a response time of the liquid crystal layer corresponding to the W sub-pixel $P_{SW}$. Further, the aperture ratio is enlarged if the spaces between the first and second auxiliary pixel electrodes are increased.

In the above-mentioned examples, it is described that the white (W) sub-pixel $P_{SW}$ surrounded by the red (R), green (G), blue (B) and yellow (Y) sub-pixels $P_{SR}$, $P_{SG}$, $P_{SB}$ and $P_{SY}$ has a diamond shape. However, the white (W) sub-pixel $P_{SW}$ can be formed to have various shapes, as shown in FIGS. 16-18.

Figure 16:
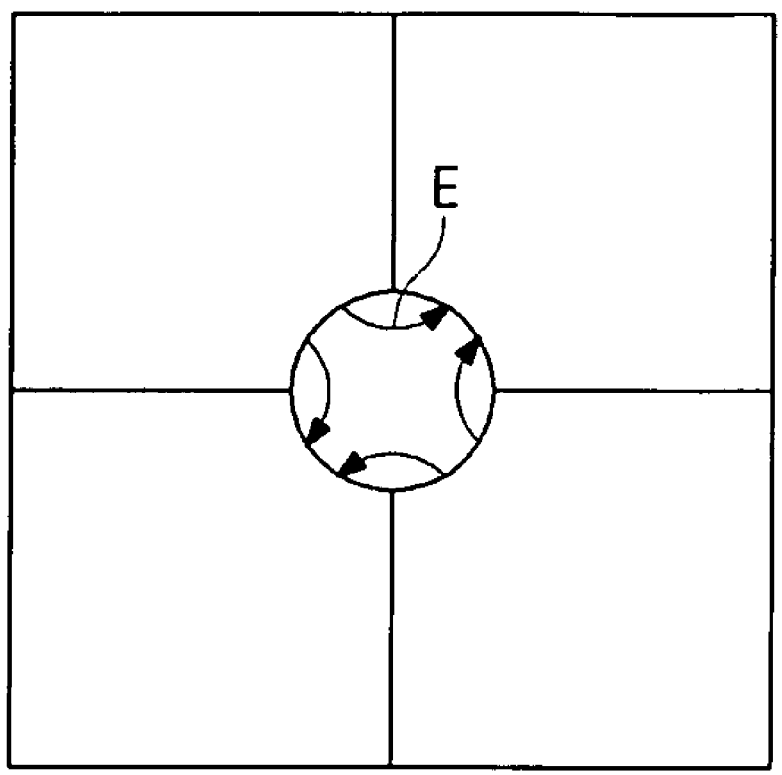
FIGS. 16-18 are schematic conceptual illustrations showing pixels according to the present invention.

In FIG. 16, the white (W) sub-pixel may have a circular or oval shape, and the red (R), green (G), blue (B) and yellow (Y) sub-pixels may have round-corner-cut sides surrounding the white (W) sub-pixel. At this point, the indirect electric field E is formed in the white (W) sub-pixel by the inventive principle described before.

Figure 17:
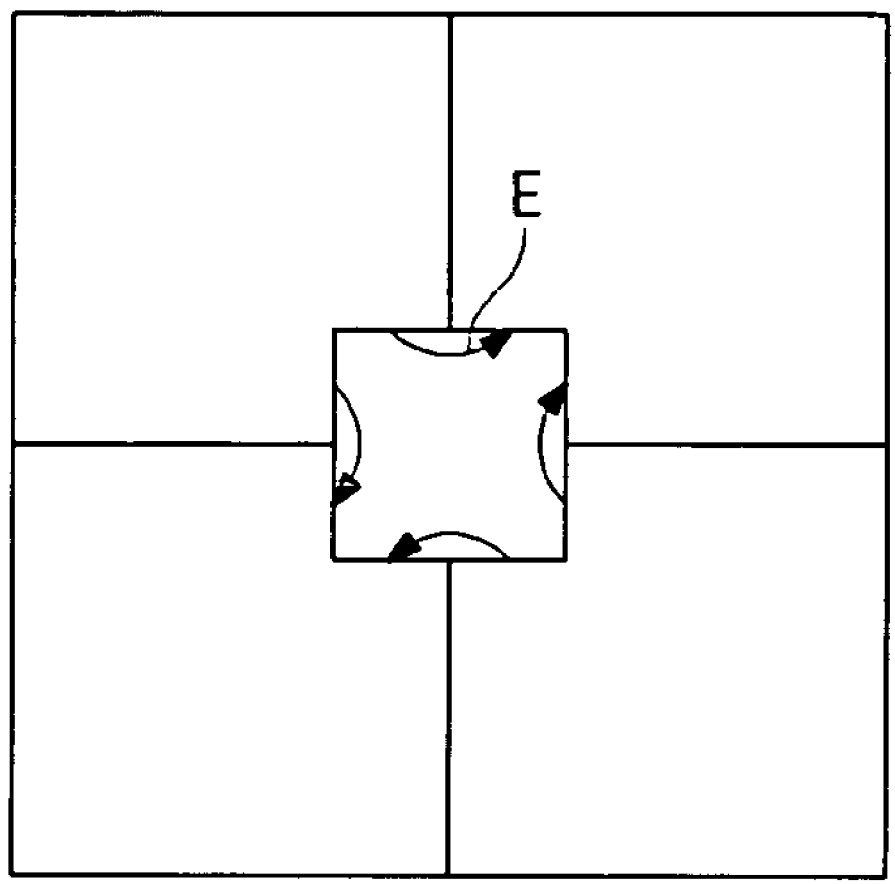

In FIG. 17, the white (W) sub-pixel may have a square or rectangle shape, and the red (R), green (G), blue (B) and yellow (Y) sub-pixels may have L-shaped-corner-cut sides surrounding the white (W) sub-pixel. At this point, the indirect electric field E is formed in the white (W) sub-pixel by the inventive principle described before.

Figure 18:
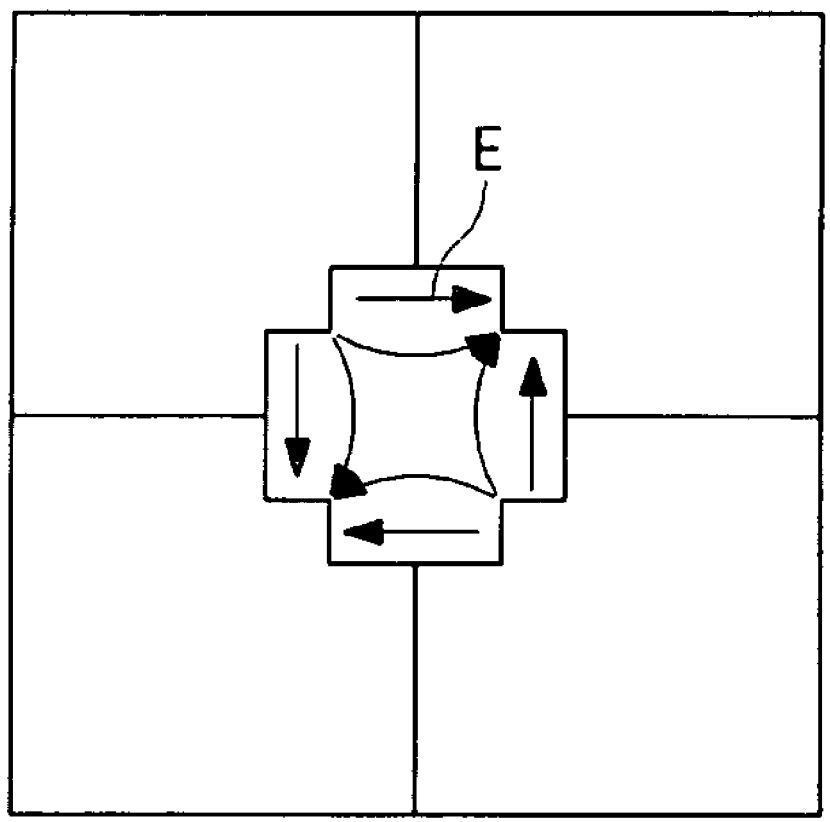

In FIG. 18, the white (W) sub-pixel may have a cruciform shape, and the red (R), green (G), blue (B) and yellow (Y) sub-pixels may have W-shaped-corner-cut sides surrounding the white (W) sub-pixel. At this point, the indirect electric field E is formed in the white (W) sub-pixel by the inventive principle described before.

Furthermore, although not shown in FIGS. 14 and 15, the IPS-mode LCD device includes a first substrate having gate lines, data lines, the switching TFTs, the pixel electrodes and the common electrodes, a second substrate having the black matrix and color filter layer, and a liquid crystal layer interposed between the first and second substrates.

According to the present invention, the LCD device has red (R), green (G), blue (B) and yellow (Y) sub-pixels that surround the white (W) sub-pixel. Further, the data signals applied to the pixel electrodes of the red (R), green (G), blue (B) and yellow (Y) sub-pixels form the electric field in the white (W) sub-pixel. Therefore, the LCD device of the present invention may have automatically adjusted brightness and aperture ratio in each pixel, thereby increasing the contrast ratio in each frame. Further, since the yellow (W) sub-pixel displaying yellow color is adopted, the color gamut of the LCD device is enlarged.

It will be apparent to those skilled in the art that various modifications and variations can be made in the liquid crystal display device of the present invention without departing from the spirit or scope of the invention. Thus, it is intended that the present invention covers the modifications and variations of this invention provided they come within the scope of the appended claims and their equivalents.

What is claimed is:

1. A liquid crystal display device, comprising:
   a first substrate including a plurality of pixels each having a white (W) sub-pixel and red (R), green (G), blue (B) and yellow (Y) sub-pixels surrounding the W sub-pixel;
   gate lines formed over the first substrate;
   data lines formed substantially perpendicular to and crossing the gate lines over the first substrate;
   thin film transistors connected to the gate and data lines over the first substrate;
   first to fourth pixel electrodes each connected to each of the thin film transistors and disposed to correspond to one of the R, G, B and Y sub-pixels; a color filter layer including red (R), green (G), blue (B) and yellow (Y) color filters on a second substrate, each of the R, G, B and Y color filters corresponding to one of the R, G, B and Y sub-pixels of the first substrate;
   a common electrode on the color filter layer; and
   a liquid crystal layer interposed between the color filter layer and the first to fourth pixel electrodes.

2. The device according to claim 1, wherein two neighboring electrodes of the first to fourth pixel electrodes receive different voltages having opposite polarities, respectively.

3. The device according to claim 1, wherein the W sub-pixel includes an indirect electric field formed by the first to fourth pixel electrodes.

4. The device according to claim 3, wherein the indirect electric field is generated between two neighboring electrodes of the first to fourth pixel electrodes.

5. The device according to claim 3, wherein a portion of the liquid crystal layer corresponding to the W sub-pixel is driven by the indirect electric field in each pixel.

6. The device according to claim 5, wherein the portion of the liquid crystal layer corresponding to the W sub-pixel has a adjustable transmittance based on a voltage difference between voltages applied to two neighboring electrodes of the first to fourth pixel electrodes.

7. The device according to claim 1, wherein each of the R, G, B and Y sub-pixels has a substantially rectangle shape including a corner-cut side.

8. The device according to claim 7, wherein the R, G, B and Y sub-pixels form a substantially square arrangement.

9. The device according to claim 7, wherein the W sub-pixel is defined by the corner-cut sides of each of the R, G, B and Y sub-pixels.

10. The device according to claim 9, wherein the W sub-pixel has one of a substantially diamond, circle, oval, square and cruciform shape.

11. The device according to claim 1, wherein the color filter layer further includes a white (W) color filter corresponding to the W sub-pixel.

12. The device according to claim 11, wherein the common electrode is disposed on the W color filter.

13. A liquid crystal display device, comprising:
   a first substrate including a plurality of pixels each having a white (W) sub-pixel and red (R), green (G), blue (B) and yellow (Y) sub-pixels surrounding the W sub-pixel;
   gate lines formed over the first substrate;
   data lines formed substantially perpendicular to and crossing the gate lines over the first substrate;

thin film transistors connected to the gate and data lines over the first substrate;

first to fourth pixel electrodes disposed in the respective R, G, B and Y sub-pixels over the first substrate and connected to the thin film transistors, wherein each of the first to fourth pixel electrodes has a turbinate shape corresponding to a shape of one of the R, G, B and Y sub-pixels;

common electrodes disposed in the respective R, G, B and Y sub-pixels over the first substrate and spaced apart from the respective first to fourth pixel electrodes, wherein each of the common electrodes has a turbinate shape corresponding to a shape of one of the first to fourth pixel electrodes;

a color filter layer including red (R), green (G), blue (B) and yellow (Y) color filters on a second substrate, each of the R, G, B and Y color filters corresponding to one of the R, G, B and Y sub-pixels; and a liquid crystal layer interposed between the color filter layer and the first to fourth pixel electrodes.

14. The device according to claim 13, further comprising first red (R), green (G), blue (B) and yellow (Y) auxiliary electrodes extending from the first to fourth pixel electrodes, respectively, and second red (R), green (G), blue (B) and yellow (Y) auxiliary electrodes perpendicularly extending from the first red (R), green (G), blue (B) and yellow (Y) auxiliary electrodes, respectively.

15. The device according to claim 14, wherein the first R auxiliary electrode is substantially parallel to the second Y auxiliary electrode, the first G auxiliary electrode is substantially parallel to the second R auxiliary electrode, the first B auxiliary electrode is substantially parallel to the second G auxiliary electrode, and the first Y auxiliary electrode is substantially parallel the second B auxiliary electrode.

16. The device according to claim 14, wherein the W sub-pixel includes indirect electric fields formed between the first R auxiliary electrode and the second Y auxiliary electrode, between the first G auxiliary electrode and the second R auxiliary electrode, between the first B auxiliary electrode and the second G auxiliary, and between the first Y auxiliary electrode and the second B auxiliary electrode.

17. The device according to claim 16, wherein a portion of the liquid crystal layer corresponding to the W sub-pixel is driven by the indirect electric fields of each pixel.

18. The device according to claim 13, wherein two neighboring electrodes of the first to fourth pixel electrodes receive different voltages having opposite polarities, respectively.

19. The device according to claim 18, wherein the portion of the liquid crystal layer corresponding to the W sub-pixel has a adjustable transmittance based on a voltage difference between the voltages applied to two neighboring electrodes of the first to fourth pixel electrodes.

20. The device according to claim 13, wherein each of the R, G, B and Y sub-pixels has a substantially rectangle shape including a corner-cut side.

21. The device according to claim 20, wherein the R, G, B and Y sub-pixels form substantially a square.

22. The device according to claim 20, wherein the W sub-pixel is defined by the corner-cut sides of the R, G, B and Y sub-pixels.

23. The device according to claim 22, wherein the W sub-pixel has one of substantially a diamond, circle, oval, square and cruciform shape.

24. The device according to claim 13, wherein the color filter layer further includes a white (W) color filter corresponding to the W sub-pixel.

* * * * *